H. H. BUCKMAN, Jr.
ACETYLENE GAS PACKAGE.
APPLICATION FILED DEC. 1, 1910.
996,969.
Patented July 4, 1911.
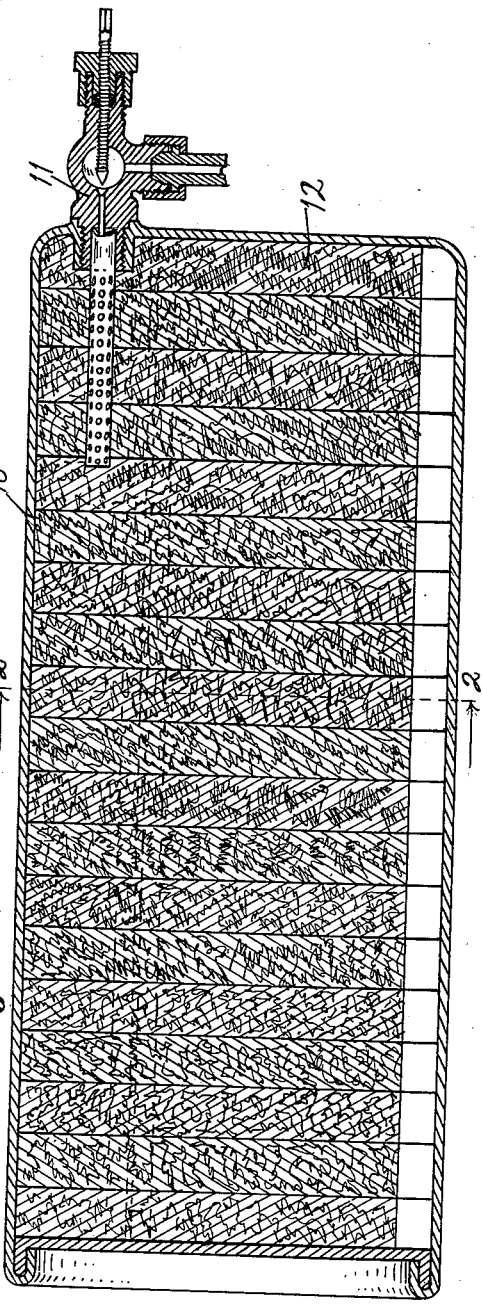
Fig-1-
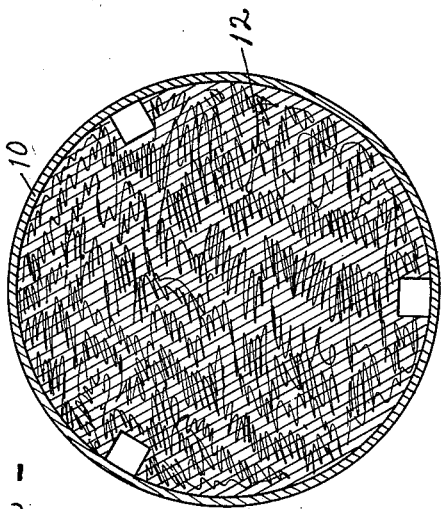
Fig-2-
WITNESSES:
O. M. McLaughlin
W. M. Goulette
INVENTOR.
Henry H. Buckman, Jr.
BY
V. H. Lockwood
ATTORNEY.

UNITED STATES PATENT OFFICE.

HENRY H. BUCKMAN, JR., OF INDIANAPOLIS, INDIANA, ASSIGNOR OF ONE-THIRD TO WILLIAM J. RICHARDS AND ONE-THIRD TO HARMON H. FULTON, OF INDIANAPOLIS, INDIANA.

ACETYLENE-GAS PACKAGE.

996,969.  Specification of Letters Patent.  Patented July 4, 1911.

Application filed December 1, 1910. Serial No. 595,139.

*To all whom it may concern:*

Be it known that I, HENRY H. BUCKMAN, Jr., of Indianapolis, county of Marion, and State of Indiana, have invented a certain useful Acetylene-Gas Package; and I do hereby declare that the following is a full, clear, and exact description thereof, reference being had to the accompanying drawings.

The object of this invention is to improve the absorption and storage of acetylene gas under pressure.

The chief feature of the invention consists in using benzophenone in connection with the acetylene gas absorbent in a vessel under pressure.

The details of the invention will be understood from the accompanying drawings and the following description and claims.

In the drawings, Figure 1 is a central vertical longitudinal section through an acetylene gas package or tank. Fig. 2 is a transverse section thereof on the line 2—2 of Fig. 1.

The invention is based upon the action of benzophenone, which may be technically described as diphenylketone, when dissolved in liquids used for absorbing acetylene.

When benzophenone is dissolved in the proper amount of absorbent for acetylene, such as amyl alcohol, acetic acid, acetone, methyl alcohol, ethyl alcohol, etc., it greatly increases the ability of these substances to absorb acetylene gas. Again, when benzophenone is dissolved in the proper amount of solvents of the kind above mentioned, it has been shown experimentally that such solutions, when they absorb acetylene either under subnormal, normal or hypernormal pressure, are less liable to detonation than when the benzophenone is not used. Again, when benzophenone, is dissolved in the proper amount in said solvents as above mentioned and acetylene gas is absorbed by such solutions under subnormal, normal and hypernormal pressure, the vapor tensions of such solutions become less, and for this reason, the influence of temperature upon the solubility of acetylene in the liquids is much reduced. This insures a much more steady delivery of the gas from a container where it may be stored in such absorbents. In the older methods, where acetylene gas is stored in alcohol, amyl ether, acetone, etc., the effect of raising the temperature of the container in which the gas and liquid are stored, results in a great increase of pressure, and vice versa. The addition of benzophenone in proper amount renders this effect of temperature very much less marked, and the total amount of acetylene gas which can be gotten from a container in which the gas has been stored under pressure in a solution of benzophenone in a liquid like those mentioned, will be more nearly equal on a hot day and a cold day than when the benzophenone is not used.

The gas package includes a metal tank 10 provided with a suitable reducing valve 11 for controlling the issue of the gas from the tank. The tank is filled with blocks or cakes of asbestos 12, or any other equivalent material for holding immobile a suitable liquid solvent or absorbent, such as amyl alcohol, acetic acid, acetone, methyl alcohol, ethyl alcohol, etc. Said tank is charged with one of said absorbent liquids, but before charging the tank with said liquid, benzophenone is introduced into the liquid in suitable proportions varying according to the sort of absorbent liquid employed. Thus, for example, when the absorbent liquid is methyl alcohol, from two to five per cent. of benzophenone will suffice, although this invention is not intended to be limited to any particular proportion because of the wide variations thereof of different absorbent liquids. Said acetylene gas is introduced in the tank under high pressure, in a manner which is well known. The result is, as has been stated, that the absorbing power of the solvent liquid will be greatly increased by the benzophenone combined therewith, so that much more acetylene gas can be stored in said tank than if said benzophenone were not used. Likewise, there is much less danger of explosion from detonation and its greatly reduced variation of pressure in summer and winter or extremes of temperature.

I claim as my invention:—

1. In an acetylene gas package, the combination of acetylene gas, benzophenone and a liquid absorbent for the acetylene gas.

2. In an acetylene gas package, the combination with a closed tank, a reducing valve for controlling the outlet, a liquid absorbent for acetylene gas in said tank, and acetylene gas in said tank under pressure, of benzophenone in said liquid absorbent, substantially as and for the purpose set forth.

3. An acetylene gas package comprising a closed tank, a charge of liquid absorbent for acetylene gas in said tank, means in the tank for rendering the absorbent liquid immobile, benzophenone in said liquid absorbent, acetylene gas in said tank under pressure, and a reducing valve for controlling the outlet from said tank.

In witness whereof, I have hereunto affixed my signature in the presence of the witnesses herein named.

HENRY H. BUCKMAN, Jr.

Witnesses:
G. H. BOINK,
H. J. WELLS.